(12) United States Patent
Hamilton, II et al.

(10) Patent No.: US 7,953,519 B2
(45) Date of Patent: May 31, 2011

(54) ENERGY USAGE MONITORING AND BALANCING METHOD AND SYSTEM

(75) Inventors: Rick Allen Hamilton, II, Charlottesville, VA (US); Julianne Frances Haugh, Austin, TX (US); James Robert Kozloski, New Fairfield, CT (US); Brian Marshall O'Connell, Cary, NC (US); Clifford Alan Pickover, Yorktown Heights, NY (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 402 days.

(21) Appl. No.: 12/251,583

(22) Filed: Oct. 15, 2008

(65) Prior Publication Data

US 2010/0094476 A1    Apr. 15, 2010

(51) Int. Cl.
    *G01R 21/00* (2006.01)
(52) U.S. Cl. .......................... 700/295; 700/297; 702/62
(58) Field of Classification Search ................. 700/295, 700/297; 702/62
    See application file for complete search history.

(56) References Cited

U.S. PATENT DOCUMENTS

| | | | |
|---|---|---|---|
| 5,894,422 A * | 4/1999 | Chasek | 700/291 |
| 6,882,904 B1 | 4/2005 | Petrie et al. | |
| 6,885,914 B2 * | 4/2005 | Shimode et al. | 700/288 |
| 7,177,728 B2 | 2/2007 | Gardner | |
| 2004/0030457 A1 | 2/2004 | Bayoumi et al. | |
| 2004/0098142 A1 | 5/2004 | Warren et al. | |
| 2005/0055137 A1 * | 3/2005 | Andren et al. | 700/291 |
| 2008/0040296 A1 | 2/2008 | Bridges et al. | |

* cited by examiner

*Primary Examiner* — Ryan A Jarrett
(74) *Attorney, Agent, or Firm* — Schmeiser, Olsen & Watts; John R. Pivnichny

(57) ABSTRACT

A monitoring method and system. The method includes monitoring by a monitoring apparatus, a power configuration for electrical devices and a status for power supplier entities. The monitoring apparatus re-balances a power usage for the electrical devices. The monitoring apparatus generates a first report indicating current loads associated with the electrical devices. The monitoring apparatus transmits the first report to the power supplier entities. The monitoring apparatus generates a group of reports indicating power consumption associated with the power supplier entities. The monitoring apparatus transmits each report of the group of reports to an associated power supplier entity of the power supplier entities. The monitoring apparatus generates a second report indicating updated power consumption associated with the power supplier entities. The monitoring apparatus stores the second report.

20 Claims, 10 Drawing Sheets

ENERGY USAGE MONITORING AND BALANCING METHOD AND SYSTEM

FIELD OF THE INVENTION

The present invention relates to a method and associated system for monitoring energy usage and rebalancing energy loads based on the monitored energy usage.

BACKGROUND OF THE INVENTION

Monitoring power systems typically comprises an inaccurate process with little flexibility. Accordingly, there exists a need in the art to overcome at least some of the deficiencies and limitations described herein above.

SUMMARY OF THE INVENTION

The present invention provides a method comprising:
monitoring, by a monitoring apparatus, a power configuration for a plurality of electrical devices;
monitoring, by said monitoring apparatus, a status for a plurality of power supplier entities:
re-balancing, by said monitoring apparatus, a power usage for said plurality of electrical devices;
generating, by said monitoring apparatus, a first report indicating current loads associated with said plurality of electrical devices;
transmitting, by said monitoring apparatus to said plurality of power supplier entities, said first report;
generating, by said monitoring apparatus, a group of reports indicating a power consumption associated with said plurality of power supplier entities;
transmitting, by said monitoring apparatus, each report of said group of reports to an associated power supplier entity of said plurality of power supplier entities;
generating, by said monitoring apparatus, a second report indicating an updated power consumption associated with said plurality of power supplier entities; and
storing, by said monitoring apparatus, said second report.

The present invention advantageously provides a simple method and associated system capable of monitoring power systems.

DETAILED DESCRIPTION OF THE INVENTION

Figure 1:
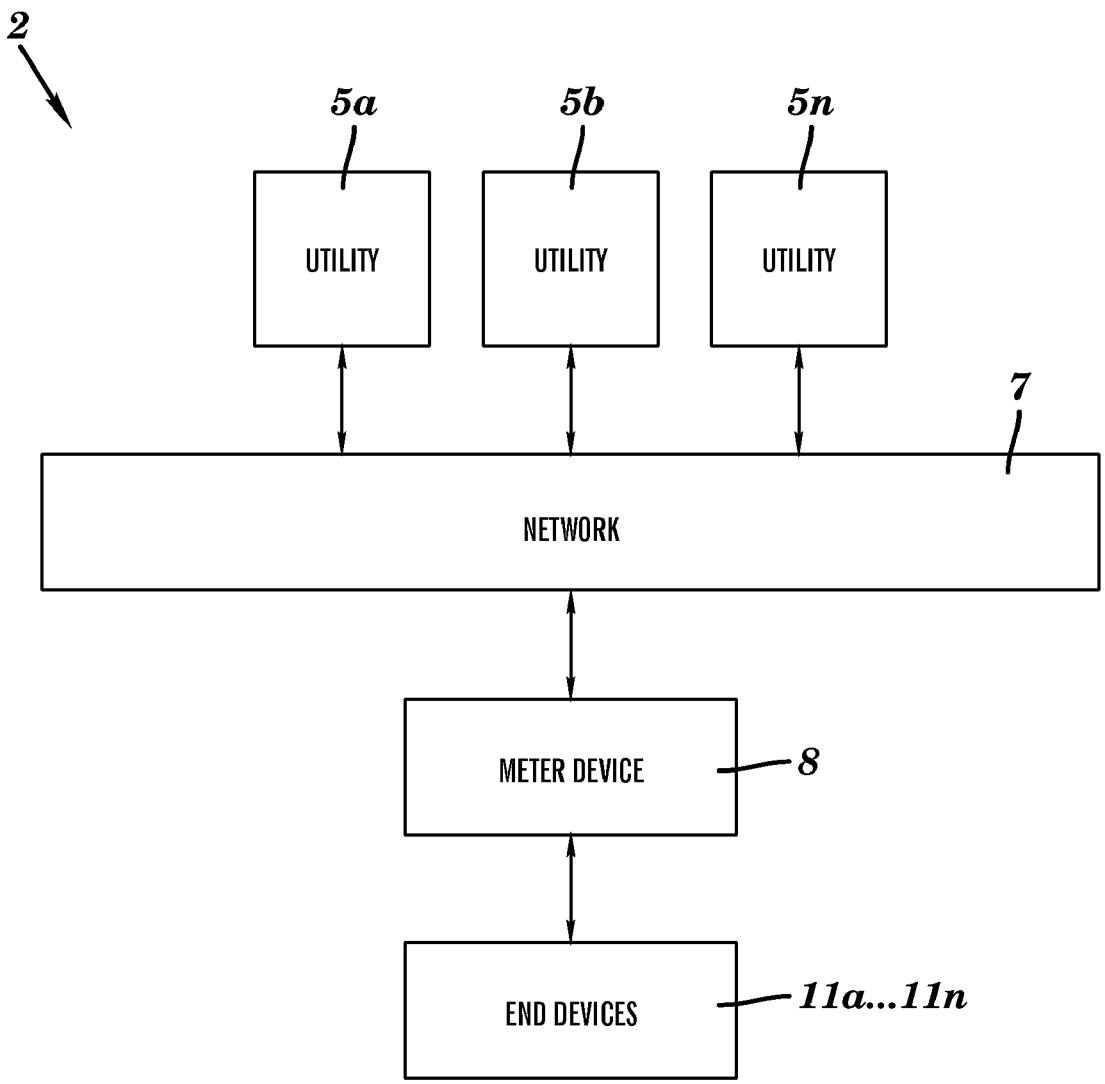
FIG. 1 illustrates a system for monitoring energy usage and rebalancing energy loads based on the monitored energy usage, in accordance with embodiments of the present invention.

FIG. 1 illustrates a system 2 for monitoring energy usage and rebalancing energy loads based on the monitored energy usage, in accordance with embodiments of the present invention. System 2 comprises a meter device 8 connected to end devices 11a . . . 11n and a plurality of utilities 5a . . . 5n (i.e., electric power supplier entities). End devices 11a . . . 11n may comprise any type of electrical device that consumes or distributes electrical power (e.g., household appliances, audio/video apparatuses, computers, lights, heaters, circuits in a distribution panel, etc) provided by utilities 5a . . . 5n. Utilities 5a . . . 5n may comprise any type of electrical power supplier that produces and/or distributes electrical power. Utilities 5a . . . 5n may produce and/or distribute any type of electrical power including, inter alia, fossil fuel generated power, steam generated power, hydro generated power, solar generated power, wind generated power, fuel cell generated power, etc. Meter device 8 comprises an electrical power monitoring meter (or an add on device for an electrical power monitoring meter) which serves as a central processing location for monitoring available power from utilities 5a . . . 5n (i.e., supply) and an actual load (i.e., demand) associated with end devices 11a . . . 11n. Meter device 8 coordinates changes to utilities 5a . . . 5n allocated to end devices 11a . . . 11n or branch circuits (e.g., circuits in an electrical distribution/circuit breaker panel). Meter device 8 reports a current demand (i.e., on a per power supplier basis) to utilities 5a . . . 5n. Meter device 8 may comprise a memory system. The memory system may comprise a single memory system. Alternatively, the memory system may comprise a plurality of memory systems. The memory system may be internal to meter device 8 or external to meter device 8. Meter device 8 may comprise a software application for controlling functionality. Meter device 8 is connected to utilities 5a . . . 5n through a network 7. Network 7 may comprise any type of network including, inter alia, a local area network, (LAN), a wide area network (WAN), the Internet, etc. Network 7 may comprise a wireless network. Meter device 8 may be directly connected to end devices as illustrated in FIG. 1. Alternatively, meter device 8 may be connected to end devices via network 7.

Meter device 8 performs the following functions:

1. Meter device 8 receives periodic reports from one or more power suppliers (e.g., utilities 5a . . . 5n) with regard to power availability. The reports may include an acknowledgement of the current demand as well as any additional supply power that is available for new loads.
2. Meter device 8 provides periodic reports to one or more power suppliers (e.g., utilities 5a . . . 5n) with regard to actual power demand.
3. Meter device 8 maintains a total power used (e.g., kilowatt hours) per power supplier.

4. Meter device 8 maintains a total power used (e.g., kilowatt hours) which is not associated with a specific power supplier and associates the total power used with a default power supplier.
5. Meter device 8 provides power totals used (e.g., kilowatt hours) per power supplier.
6. Meter device 8 accumulates otherwise unallocated power usage and allocates the unallocated power to a default power supplier.
7. Meter device 8 accumulates per power supplier totals of demand and signals a utilization device(s) and branch circuit monitors in order to switch power suppliers to a secondary source or to reduce power consumption (including reducing to zero) based on a device priority and an availability of alternate power suppliers for any given load. An unallocated load is assigned a highest priority.
8. Meter device 8 monitors power suppliers for availability of additional power (supply) and signals a utilization device(s) and branch circuit monitors in order to switch power suppliers to primary suppliers or to resume power consumption.

Meter device 8 allows for monitoring, recording, and managing information from power producers regarding different power sources (e.g., green power, non-green power, etc) used in producing power currently on the power grid. Green power is defined herein as environmentally friendly (i.e., emitting low levels of pollution) generated power such as, inter alia, wind power, solar power, hydro power, fuel cell power, etc. Non-green or standard power is defined herein as any power that is not green power (e.g., fossil fuel generated power, etc). Meter device 8 interacts with utilities 5a . . . 5n to request power of different sources to be placed onto the power grid. Meter device 8 allows a user to adjust consumption patterns depending on a current mix of power on the grid and to specify types of power that are supplied to meet the user's power demands. Meter device 8 permits the user to select green energy if desired at either a household or device level.

Meter device 8 is placed between an incoming power line and a household/business power distribution panel and performs the following functions associated with monitoring energy usage and rebalancing energy loads based on the monitored energy usage:

1. Power type identification—Meter device 8 receives signals from power suppliers (e.g., utilities 5a . . . 5n) identifying a current blend of energy sources used to generate power on the grid. Additionally, power suppliers may broadcast the information (i.e., current blend) over the power grid or through alternative data sources such as, inter alia, the Internet. The information may be associated with green power. For example, if a user examines a monitor on meter device 8 and discerns that 95% of the energy is non-green at the current moment, the user may choose to turn off nonessential end devices (e.g., of end devices 11a . . . 11n) and wait until the green source of energy rises to 20% (e.g., from 5%). Additionally, an alert signal may be transmitted to the user or end device when the green energy content crosses a predetermined threshold. For example, the green energy content may rise to 20% during a windy period of the day (i.e., from wind generated power) and the alert signal may be used by the end devices to alter their power consumption (e.g., a water heater may be configured to shut off if the green energy content is below 20%).
2. End device power requests—Meter device 8 may listen (i.e. scan) for power requests from end devices that consume power. The power requests may be transmitted by the end devices within a household or office over a power line, through TCP/IP computer networking, through a radio frequency, etc. Requests from the end devices may include an end device identifier and an amount of power requested.
3. Device-level power type association—A user may configure meter device 8 to associate a specific power type with a specific end device so that requests for specific power types (e.g. green or non-green) may be aggregated and transmitted to a power supplier (e.g., any of utilities 5a . . . 5n). This configuration may be performed through a switch on the end device, a setting on a user interface of the end device, an association between an end device identifier and a power type identifier in a database, etc. Additionally, a power type association may be initiated on meter device 8 by selecting a power type or a power type percentage for a specific end device. At the same time an association is made, a user may also set the stringency of the association such that for a weak level of stringency, the power type is requested of any of utilities 5a . . . 5n but is not required for end device operation. Alternatively, for a strict level of stringency, an end device will not operate if the associated power request cannot be met by any of the power suppliers.
4. Power type request-Power type associations are applied to each power request made by end devices within a household or office in order to aggregate power requests according to type associations and to create a power type request. For example, if 30% of power requests from end devices in a household are associated with a 50/50 blend of green and non-green energy sources, while 70% of power requests from devices in a household are associated with only green energy sources, the aggregate power type request to the power supplier will be 85% green and 15% non-green.
5. Power type selection—Meter device 8 may select a power type using the following methods:
    A. Multiple power suppliers—When multiple power suppliers are available (e.g., some green and some non-green) and connected to meter device 8, meter device 8 may consume power directly from the power suppliers as requested by a user. For example, if the present power load requests 85% green power and 15% standard power, meter device 8 may select energy from a green supplier to provide 85% of the household energy and the remainder of the power will be provided by the standard power utility.
    B. Single power suppliers—If a single supplier is available, a request for a specific amount of energy is made to a power supplier using a utility communication component as described, infra.
    C. Automated bidding—A user may configure end devices in the home or office using the end device to bid on power of a particular blend up to a specified maximum bid. Accordingly, communication of power type blend requests to power suppliers may be coupled with a bid for these blends and a power supplier may supply particular blends to the highest bidder in an automated auction. For example, a user may configure a luxury end device (e.g., a wide-screen plasma TV) with a high maximum bid for green weighted power blends to reflect the luxury nature of power consumption. Similarly, a user may configure an end device such as a water heater with a moderate maximum bid for green weighted power blends because the use of hot water may be moved to off-peak green power consumption times if the price for green power is too high. Additionally, a user may configure an expensive necessary end device such as a home heater with a high maximum bid for non-green power sources (indicating the necessity nature of the consuming end device) and with a maximum bid for green sources set at the current non-green price (indicating a desire to use green sources only when non-green sources are comparable in price).
6. Power supplier communication—This component of meter device 8 transmits power type requests to the power suppliers. The requests may be transmitted over a power line, through TCP/IP computer networking, radio frequency, etc.
7. Recording—Meter device 8 records and generates analytics for power consumption using the following methods:
   A. Power type accumulation—Meter device 8 records an amount and type of energy consumed from each power supplier. Therefore, when multiple power suppliers are contracted, each power supplier may read meter device 8 to charge an associated customer for power consumed. Additionally, a power type accumulation may be accessed by a user or regulating body to determine (i.e., given end device-level power type associations and the power consumed by each end device) an overall energy consumption mix for a household or office. This information may be used to adjust this configuration in order to affect a change in consumption mix in the future or to tabulate credits or deficits associated with the usage pattern of the household or office (e.g., carbon credits or deficits).
   B. Generated power—In installations in which meter device 8 is attached to an apparatus that generates power, such as solar panels, meter device 8 records the amount of generated electricity. This information may be transmitted to the local power supplier or recorded so that the local power supplier may inspect the apparatus to determine how much energy was produced. If the information is transmitted, the power supplier may use this generated energy as a green source that others may request to consume. Alternatively, the power supplier may record the information to remunerate the user with a renewable energy credit.
8. Communication—Power suppliers may receive communications from meter device 8. The power suppliers may listen for incoming requests over the power grid or the Internet. The requests may be encrypted so as to prevent fraudulent activity. The requests may be recorded and power generation for the power grid may be modified as a result of those requests.
9. Power generation modification—If a user requests green power, the power supplier may modify its power production methods. The power supplier may buy from a separate utility or homeowner, green power units to distribute onto its power grid. The power supplier may generate green power as well upon request by an end user. Alternatively, the power supplier may provide a signal to a requestor as to when certain types of power are available. For example, it may be predicted that from 6:00 am to 10:00 am winds should be high and therefore during this time period renewable energy may be available for use. This automated signal specifying times that renewable energy is available or predicted to be available may be useful for individual users, companies, and smart end devices. Additionally, a power supplier may transmit a signal to meter device 8 indicating that the requested power type is unavailable or that the price of the requested power type has been modified due to demand.
10. Power type identification modification—As a power supplier communicates with users (i.e., receiving and filling requests for specific power blends), the power type identification communicated to subsequent users is modified. This modification reflects the calculated remaining blend on the grid at any given time, given previous requests for particular power blends by other users and fulfillment of these requests. Therefore, a power supplier may communicate power type identifications that do not necessarily reflect the actual current blends supplied to the grid but instead represent some function of these supplied blends and the blends being consumed by individual users presently. In the absence of a bidding process, green power, for example, would be consumed on a first come first served basis.

Figure 2:
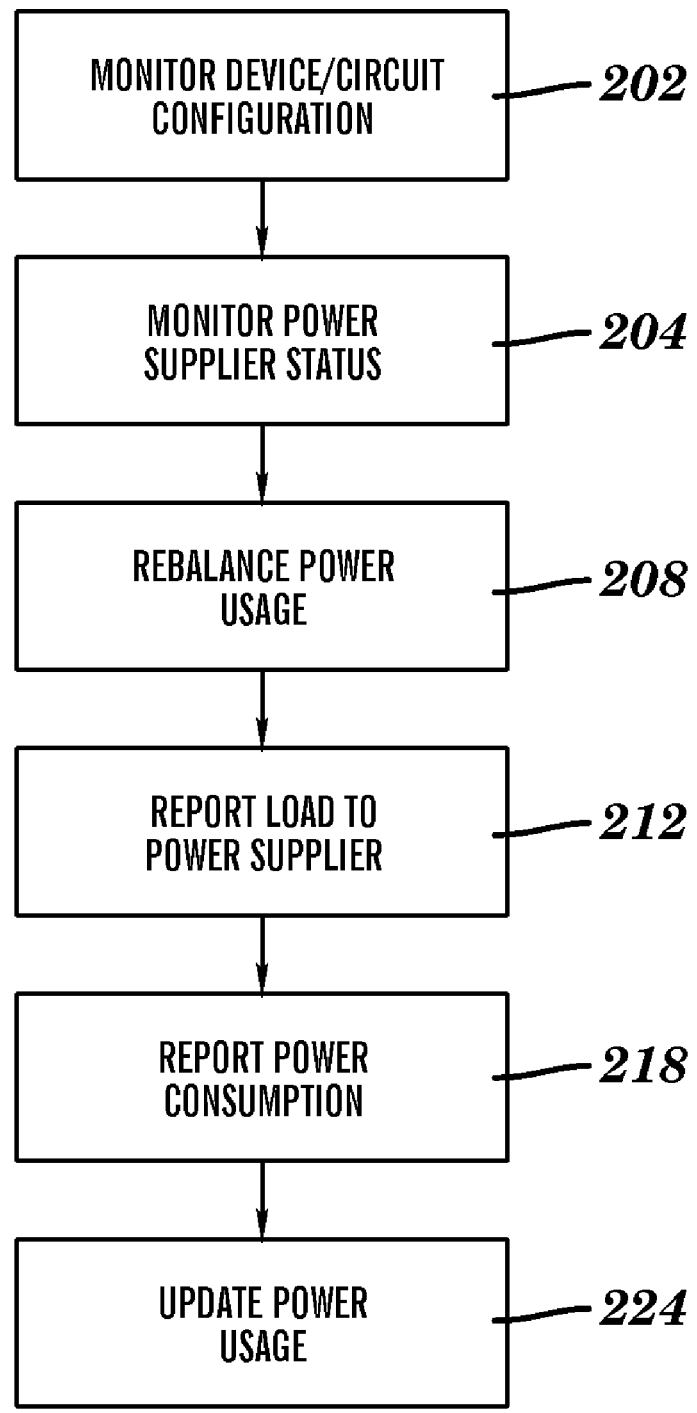
FIG. 2 illustrates a flowchart describing an algorithm used by the system of FIG. 1 for monitoring energy usage and rebalancing energy loads based on the monitored energy usage, in accordance with embodiments of the present invention.

FIG. 2 illustrates a flowchart describing an algorithm used by system 2 of FIG. 1 for monitoring energy usage and rebalancing energy loads based on the monitored energy usage, in accordance with embodiments of the present invention. In step 202, a monitoring apparatus (e.g., meter device 8 of FIG. 1) monitors a power configuration for a plurality of electrical devices (e.g., end devices 11a . . . 11n of FIG. 1). In step 204, the monitoring apparatus monitors a status for a plurality of power supplier entities (e.g., utilities 5a . . . 5n of FIG. 1). In step 208, the monitoring apparatus rebalances a power usage for the plurality of electrical devices. In step 212, the monitoring apparatus reports current loads associated with the plurality of electrical devices to the plurality of power supplier entities. The monitoring apparatus may report current loads by generating a report and transmitting the report to the plurality of power supplier entities. In step 218, the monitoring apparatus reports power consumption to the plurality of power supplier entities. The monitoring apparatus may report the power consumption to the plurality of power supplier entities by generating a group of reports indicating the power consumption and transmitting each report to an associated power supplier entity. In step 224, the monitoring apparatus generates a report indicating an updated power consumption value associated with the plurality of power supplier entities. The report is stored by the monitoring apparatus.

Figure 3:
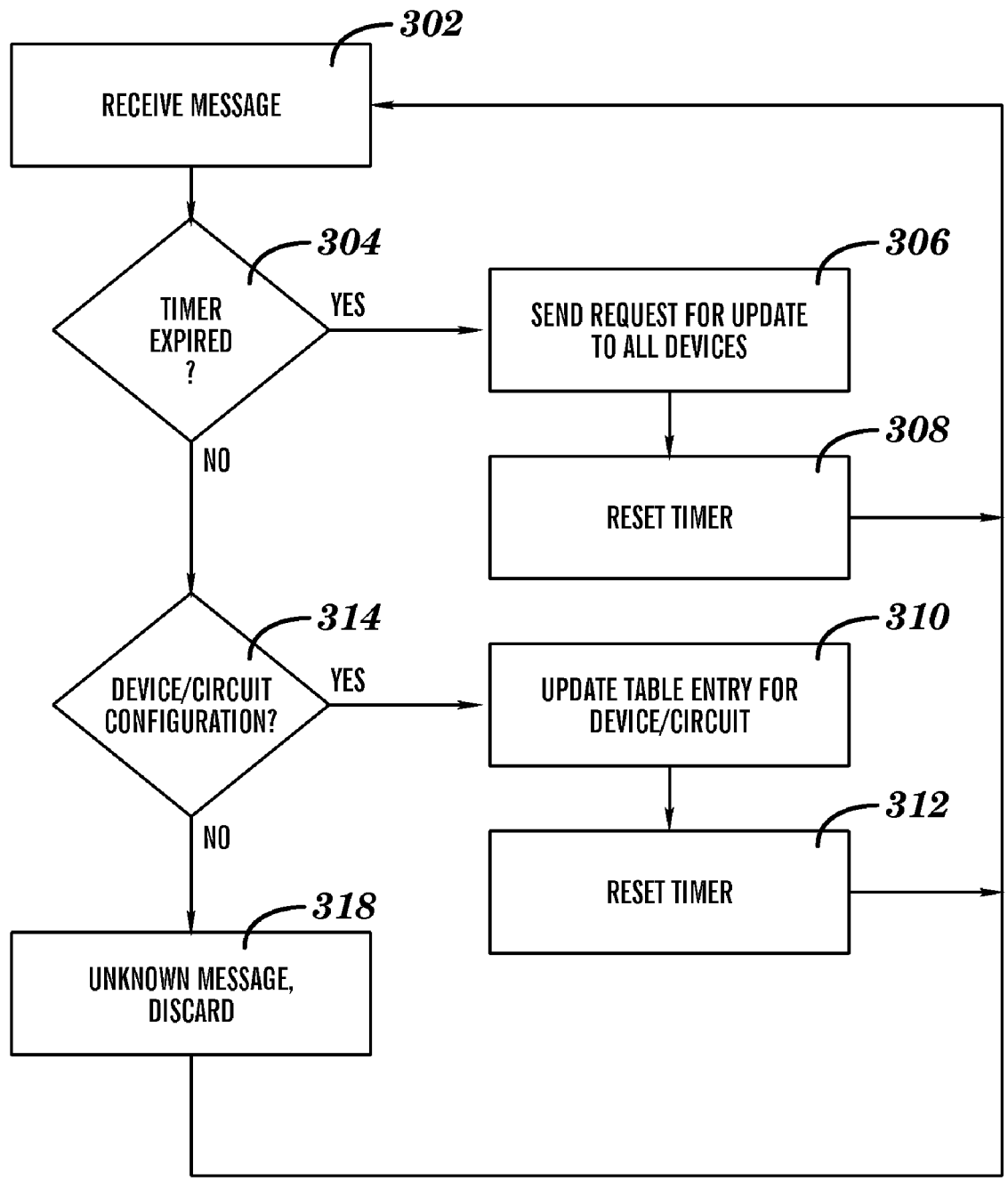
FIG. 3 illustrates a flowchart detailing a first step in the algorithm of FIG. 2, in accordance with embodiments of the present invention.

FIG. 3 illustrates a flowchart detailing step 202 in the algorithm of FIG. 2, in accordance with embodiments of the present invention. In step 302, a monitoring apparatus (e.g., meter device 8 of FIG. 1) receives a configurable interval timer or utilization device/branch circuit configuration message. In step 304, it is determined if an interval time has expired.

If in step 304, it is determined that an interval time has expired then in step 306, a request (for a configuration) is transmitted to all attached end devices and branch circuit monitors. In step 308, the timer is reset and step 302 is repeated.

If in step 304, it is determined that an interval time has not expired then in step 314, it is determined if an end device or branch circuit configuration message was received. If in step 314, it is determined that an end device or branch circuit configuration message was received then in step 310, a stored table of power supplier priorities and any relationship between a utilization device and branch circuit monitor is updated. In step 312, the timer is reset and step 302 is repeated. If in step 314, it is determined that an end device or branch circuit configuration message was not received then in step 318, any unknown message is discarded and step 302 is repeated.

Figure 4:
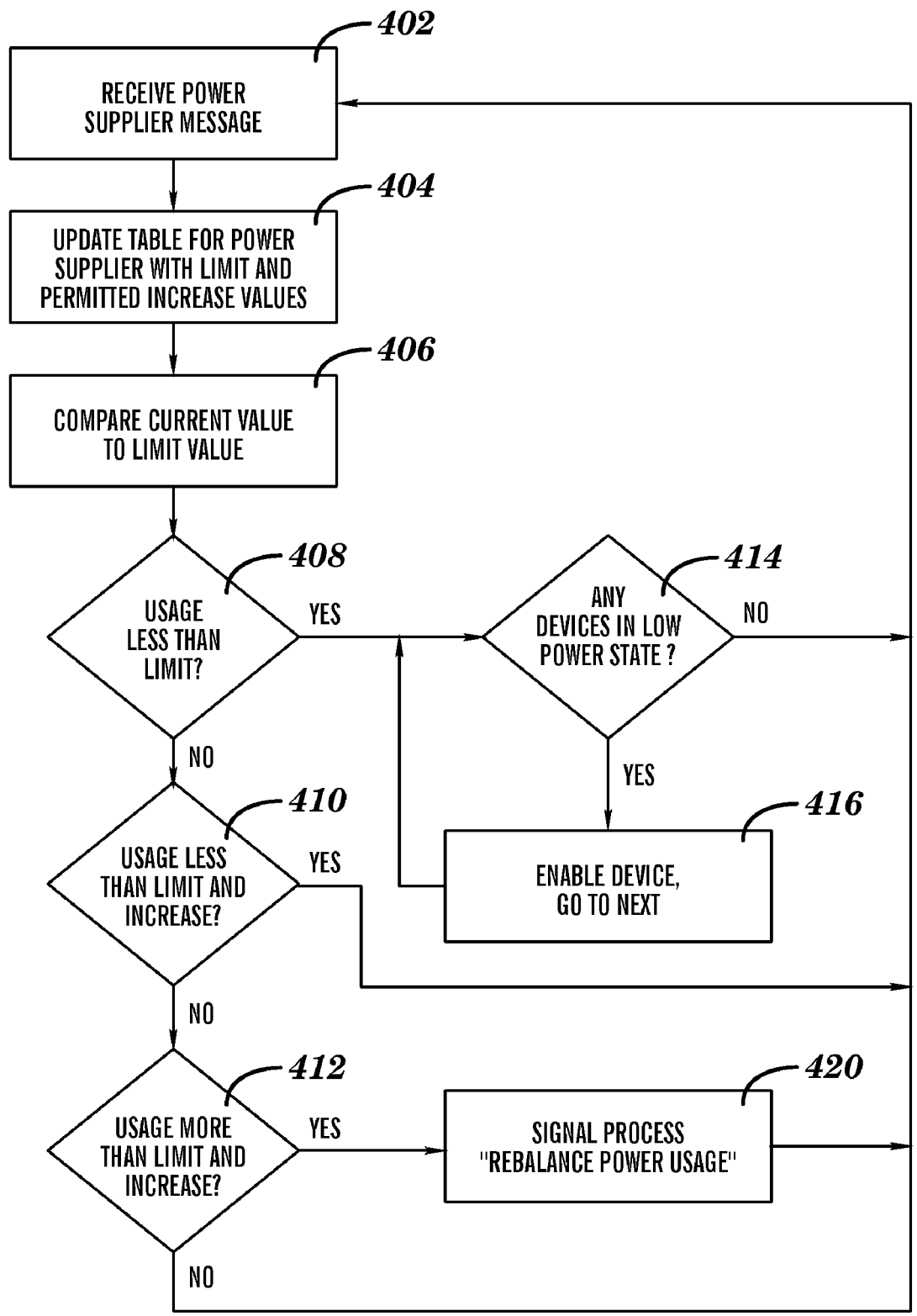
FIG. 4 illustrates a flowchart detailing a second step in the algorithm of FIG. 2, in accordance with embodiments of the present invention.

FIG. 4 illustrates a flowchart detailing step 204 in the algorithm of FIG. 2, in accordance with embodiments of the present invention. In step 402, the monitoring apparatus (e.g., meter device 8 of FIG. 1) receives a message (i.e., containing a current permitted/allocated power usage value and permitted increase in power usage value (i.e., limit value)) from a power supplier. In step 404, a power supplier table is updated with the current permitted/allocated power usage value and permitted increase in power usage values received in step 402. In step 406, a current power consumption value allocated to the power supplier(s) is compared to the current permitted/allocated power usage value. In step 408 it is determined if the current power consumption value is less than the current permitted/allocated power usage value.

If in step 408 it is determined that the current power consumption value is less than the current permitted/allocated power usage value then in step 414, it is determined if any end devices are in a low or no power state. If in step 414, it is determined that any of the end devices are in a low or no power state then in step 416, an end device in the low power state is re-enabled and step 414 is repeated for a next end device. If in step 414, it is determined that there are no end devices are in a low or no power state then step 402 is repeated.

If in step 408 it is determined that the current power consumption value is not less than the current permitted/allocated power usage value then in step 410, it is determined if the current power consumption value is greater than the permitted/allocated power usage value but less than the permitted increase in power usage. If in step 410, it is determined that the current power consumption value is greater than the permitted/allocated power usage value but less than the permitted increase in power usage then step 402 is repeated. If in step 410 it is determined that the current power consumption value is not greater than the permitted/allocated power usage value or less than the permitted increase in power usage then in step 412, it is determined if the current power consumption value is greater than the allocated power usage value and the permitted increase in power usage. If in step 412, it is determined that the current power consumption value is greater than the allocated power usage value and the permitted increase in power usage then in step 420, the monitoring apparatus signals the devices to change power suppliers or enter a reduced power state (i.e., a re-balance power usage process is performed) and step 402 is repeated.

Figure 5:
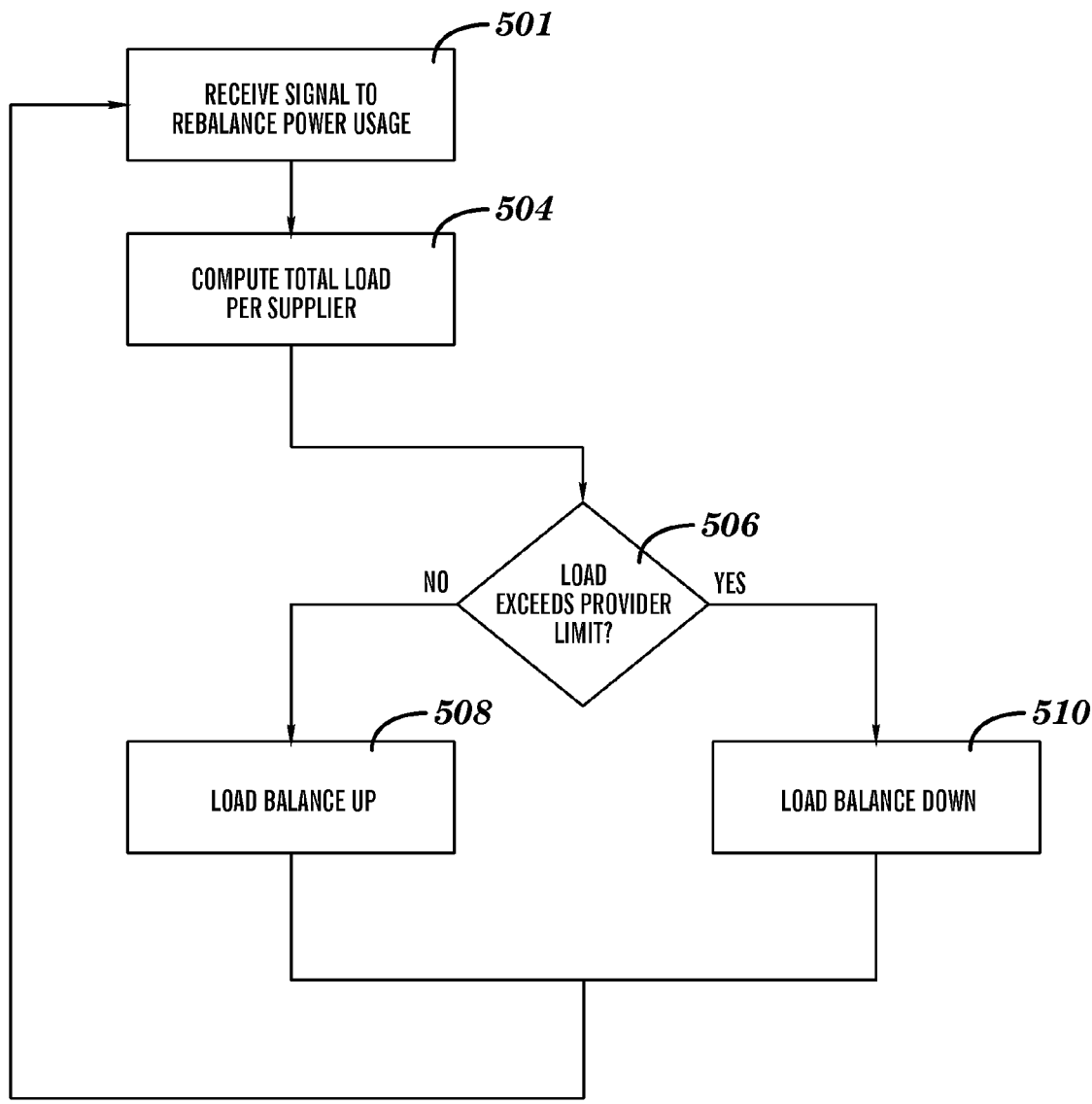
FIG. 5 illustrates a flowchart detailing a third step in the algorithm of FIG. 2, in accordance with embodiments of the present invention.

FIG. 5 illustrates a flowchart detailing step 208 in the algorithm of FIG. 2, in accordance with embodiments of the present invention. In step 501, the monitoring apparatus receives a signal to rebalance power usage. In step 504, the monitoring apparatus computes a total load for all known end devices and branch circuit loads by a priority and power supplier of each end device and branch circuit. An unallocated load is assigned a highest priority and a default power supplier. In step 506, it is determined if the total load calculated in step 504 exceeds a maximum possible load (permitted/allocated plus the permitted increase). Each end device or branch circuit is processed in decreasing (less important) order. If in step 506, it is determined that the total load calculated in step 504 exceeds a maximum possible load then in step 510, the load balance is decreased and the process is repeated for each power supplier. If in step 506, it is determined that the total load calculated in step 504 is less than a maximum possible load then in step 508, the load balance is increased and the process is repeated for each power supplier.

Figure 6:
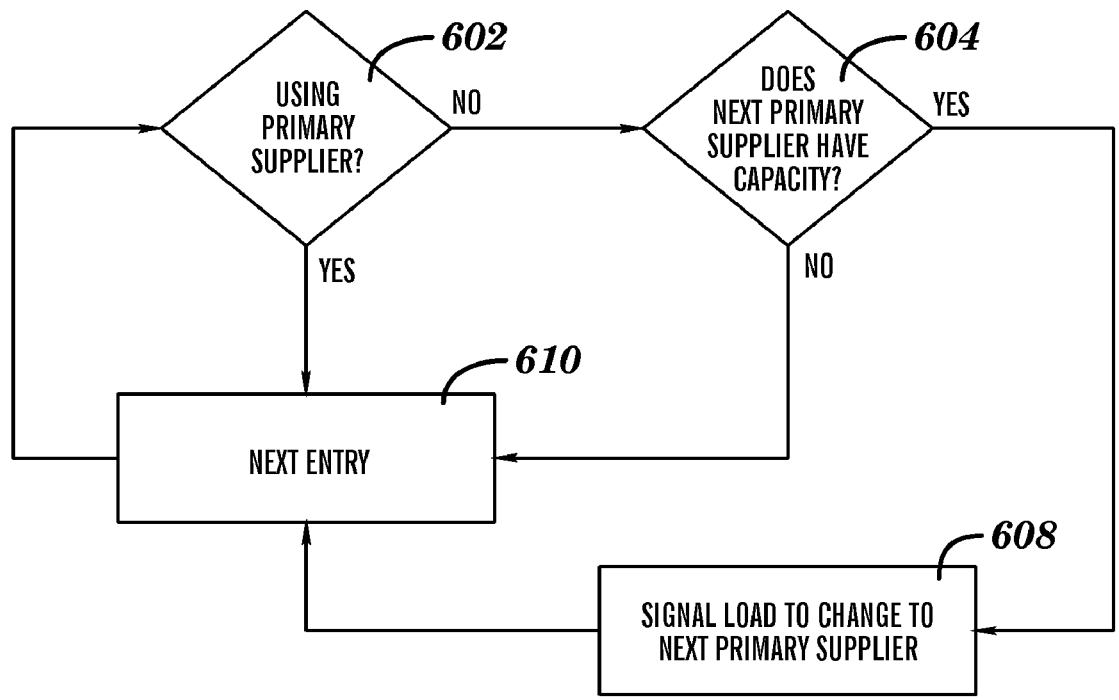
FIG. 6 illustrates a flowchart detailing a first step in the algorithm of FIG. 5, in accordance with embodiments of the present invention.

FIG. 6 illustrates a flowchart detailing step 508 in the algorithm of FIG. 5, in accordance with embodiments of the present invention. In step 602, it is determined if an end device is using a primary power supplier. If in step 602, it is determined that the end device is using a primary power supplier then in step 610, a next entry (i.e., a next end device) is determined and step 602 is repeated. If in step 602, it is determined that the end device is not using a primary power supplier then in step 604, it is determined if a next primary power supplier has capacity. If in step 604, it is determined that a next primary power supplier has capacity then in step 608, the load (i.e., the end device) is signaled to change to the next primary power supplier for power and step 610 is repeated. If in step 604, it is determined that a next primary power supplier does not have capacity then step 610 is repeated.

Figure 7:
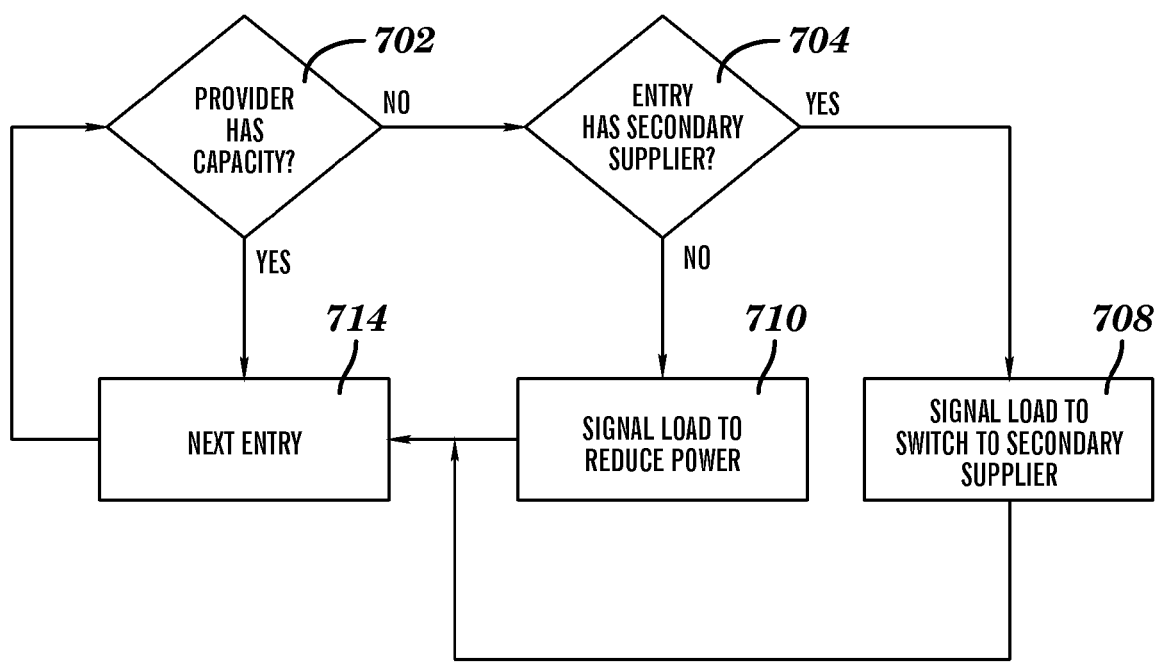
FIG. 7 illustrates a flowchart detailing a second step in the algorithm of FIG. 5, in accordance with embodiments of the present invention.

FIG. 7 illustrates a flowchart detailing step 510 in the algorithm of FIG. 5, in accordance with embodiments of the present invention. In step 702, it is determined if a power supplier has capacity. If in step 702, it is determined that the power supplier has capacity then in step 714, a next entry (i.e., a next end device) is determined and step 702 is repeated. If in step 702, it is determined that the power supplier does not have capacity then in step 704, it is determined if the entry (i.e., end device) has a secondary power supplier. If in step 704, it is determined that the entry (i.e., end device) has a secondary power supplier then in step 708, the end device is signaled to switch power consumption to the secondary supplier and step 322 is repeated for a next entry. If in step 704, it is determined that the entry (i.e., end device) does not have a secondary power supplier then in step 710, the end device is signaled to reduce power consumption and step 714 is repeated for a next entry.

Figure 8:
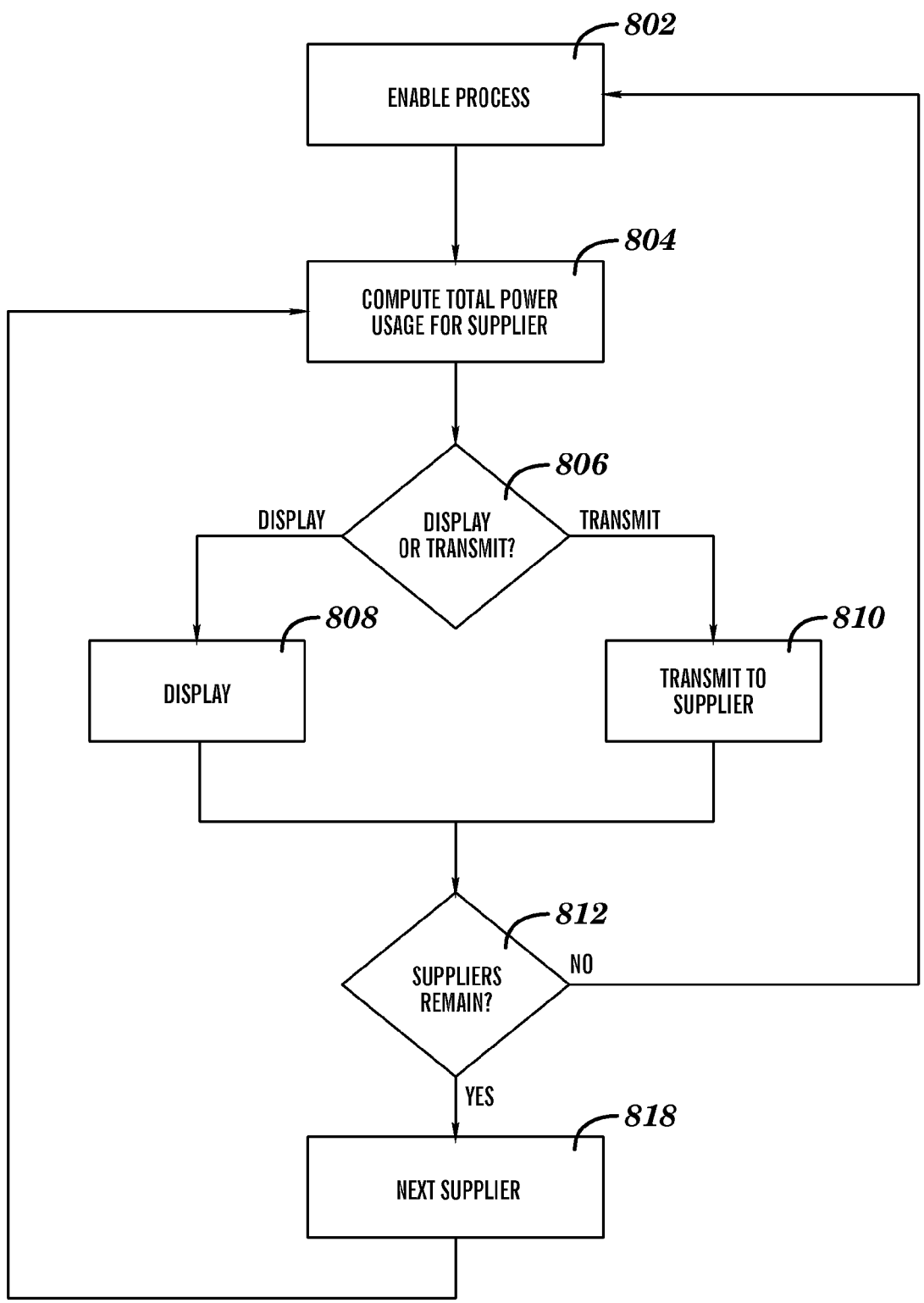
FIG. 8 illustrates a flowchart detailing multiple steps in the algorithm of FIG. 2, in accordance with embodiments of the present invention.

FIG. 8 illustrates a flowchart detailing steps 212 and 218 in the algorithm of FIG. 2, in accordance with embodiments of the present invention. In step 802, a report power consumption process is enabled. The process may be enabled by a remote power reading request or via an activation signal from the monitoring apparatus (e.g., meter device 8 of FIG. 1). The power consumption may be displayed on a panel such as, inter alia, an LCD display or transmitted wirelessly to the power supplier. In step 804, the monitoring apparatus computes a total power value for a power supplier. In step 806, it is determined if the total power value should be displayed or transmitted. If in step 806, it is determined that the total power value should be displayed then in step 808, the monitoring apparatus displays the total power value and step 812 is executed as described, infra. If in step 806, it is determined that the total power value should be transmitted then in step 810, the monitoring apparatus transmits the total power value to the power supplier. In step 812, it is determined if any additional power suppliers remain. If in step 812, it is determined that additional power suppliers remain then in step 818, a next supplier is selected and step 804 is repeated for the next supplier. If in step 812, it is determined that additional power suppliers do not remain then step 804 is repeated.

Figure 9:
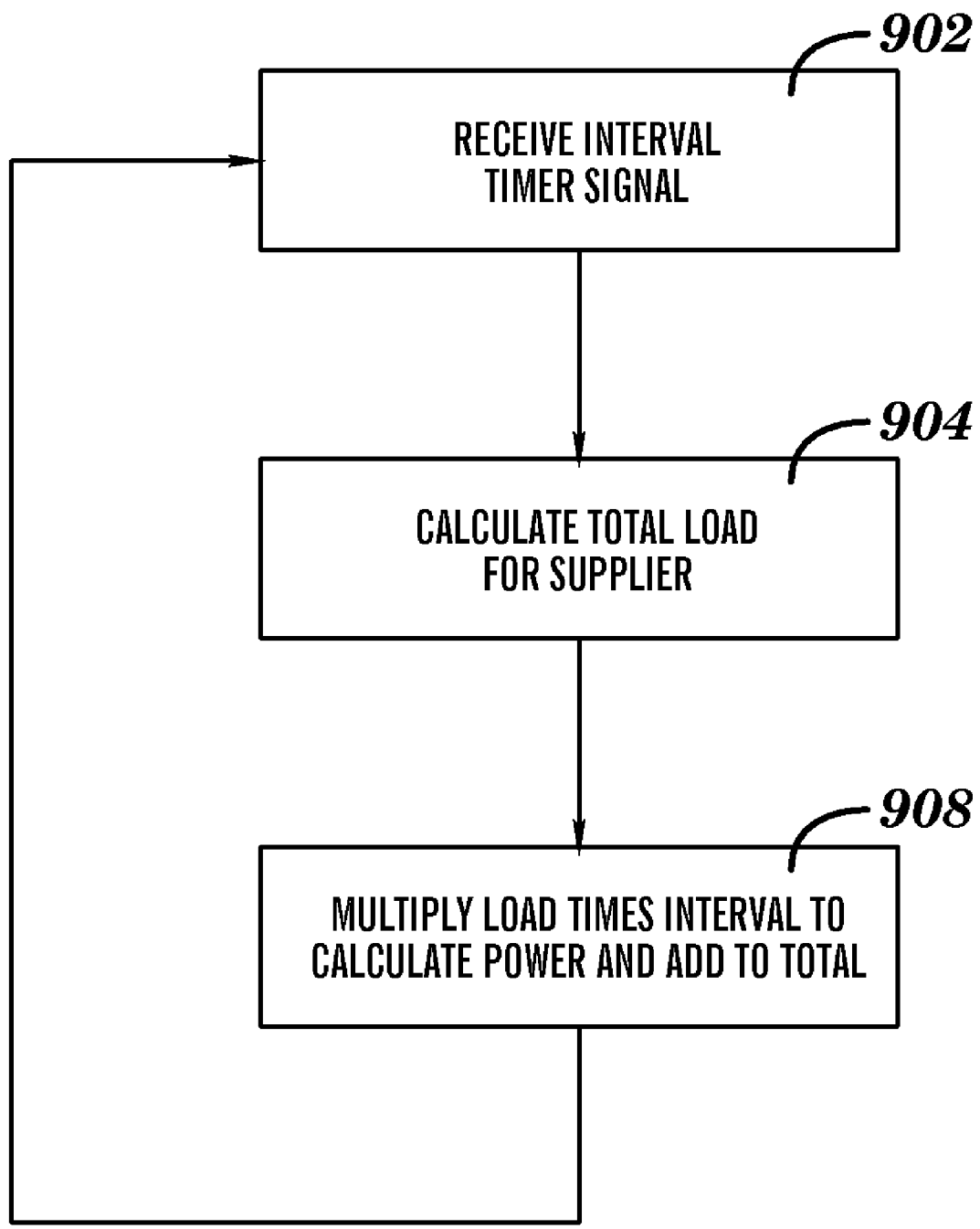
FIG. 9 illustrates a flowchart detailing a fourth step in the algorithm of FIG. 2, in accordance with embodiments of the present invention.

FIG. 9 illustrates a flowchart detailing step 224 in the algorithm of FIG. 2, in accordance with embodiments of the present invention. In step 902, an interval timer signal is received from an end device or branch circuit monitor. In step 904, the monitoring device computes a total current load (i.e., demand) and time integral for power consumption (i.e., kilowatt-hours used are the sum of all periodic loads multiplied by the time interval). In step 908, a sum of the power used by all known end devices and branch circuits is calculated and subtracted from the total current load and step 902 is repeated.

Figure 10:
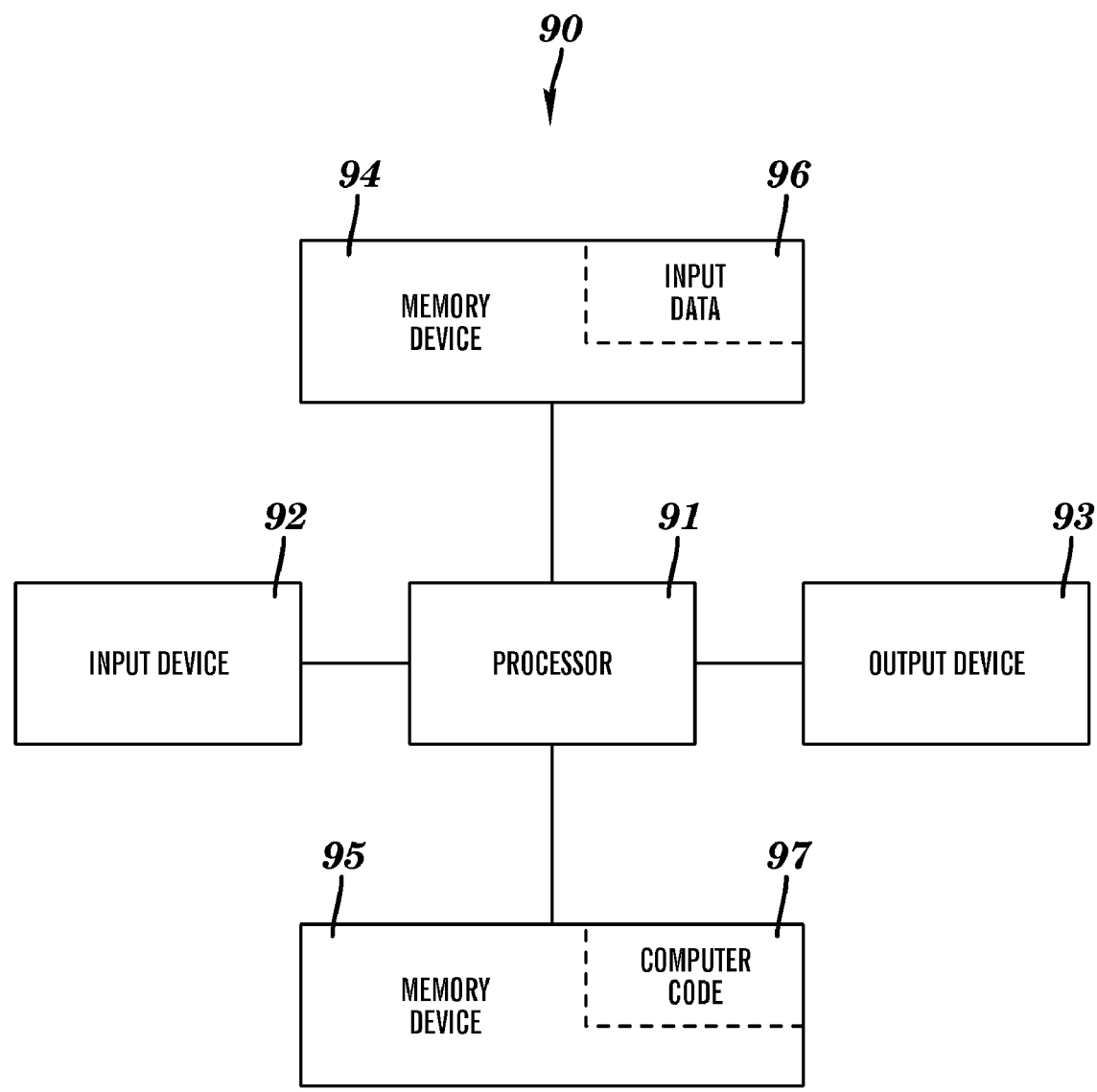
FIG. 10 illustrates a computer apparatus used for monitoring energy usage and rebalancing energy loads based on the monitored energy usage, in accordance with embodiments of the present invention.

FIG. 10 illustrates a computer apparatus 90 (e.g., meter device 8 of FIG. 1) used for monitoring energy usage and rebalancing energy loads based on the monitored energy usage, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2-9) for monitoring energy usage and rebalancing energy loads based on the monitored energy usage. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 10) may comprise the algorithms of FIGS. 2-9 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, hosted, maintained, deployed, managed, serviced, etc. by a service supplier who offers to monitor energy usage and rebalance energy loads based on the monitored energy usage. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for monitoring energy usage and rebalancing energy loads based on the monitored energy usage. In another embodiment, the invention provides a business method that performs the process steps of the invention on a subscription, advertising, and/or fee basis. That is, a service supplier, such as a Solution Integrator, could offer to perform a process for monitoring energy usage and rebalancing energy loads based on the monitored energy usage. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 10 shows the computer system 90 as a particular configuration of hardware and software, any configuration of hardware and software, as would be known to a person of ordinary skill in the art, may be utilized for the purposes stated supra in conjunction with the particular computer system 90 of FIG. 10. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method comprising:
    monitoring, by a monitoring apparatus, a power configuration for a plurality of electrical devices;
    monitoring, by said monitoring apparatus, a status for a plurality of power supplier entities;
    re-balancing, by said monitoring apparatus, a power usage for said plurality of electrical devices;
    generating, by said monitoring apparatus, a first report indicating current loads associated with said plurality of electrical devices;
    transmitting, by said monitoring apparatus to said plurality of power supplier entities, said first report;
    generating, by said monitoring apparatus, a group of reports indicating a power consumption associated with said plurality of power supplier entities;
    transmitting, by said monitoring apparatus, each report of said group of reports to an associated power supplier entity of said plurality of power supplier entities;
    generating, by said monitoring apparatus, a second report indicating an updated power consumption associated with said plurality of power supplier entities; and
    storing, by said monitoring apparatus, said second report.

2. The method of claim 1, wherein said monitoring said power configuration comprises:
    receiving, by said monitoring apparatus from a configurable interval timer in a first device of said plurality of electrical devices, a first message; and
    performing, by said monitoring apparatus, an update process associated with said plurality of electrical devices, wherein said performing is based on said message.

3. The method of claim 2, wherein said first message indicates a first power type/percentage being consumed by said first device, and wherein said method further comprises:
    receiving, by said monitoring apparatus from a configurable interval timer in a second device of said plurality of electrical devices, a second message indicating a second power type/percentage being consumed by said second device; and
    aggregating, by said monitoring apparatus, power type/percentage data from said messages, wherein said first report comprises said power type/percentage data.

4. The method of claim 1, wherein said monitoring said status comprises:
    receiving, by said monitoring apparatus from a power supplier entity of said plurality of power supplier entities, a message;
    comparing, by said monitoring apparatus in response to said receiving said message, a power consumption value for said power consumption to a predetermined threshold value;
    determining, by said monitoring apparatus based on said comparing, if said power consumption value exceeds said predetermined threshold value; and
    enabling, by said monitoring apparatus based on results of said determining, said plurality of electrical devices to perform said re-balancing.

5. The method of claim 4, wherein said determining determines that said power consumption value exceeds said predetermined threshold value, and wherein said method further comprises:
    transmitting, by said monitoring apparatus to said plurality of power supplier entities, results of said determining; and
    receiving, by said monitoring apparatus from at least one power supplier entity of said plurality of power supplier entities, an alert message indicating that said power consumption value exceeds said predetermined threshold value.

6. The method of claim 1, wherein said re-balancing said power usage comprises:
    receiving, by said monitoring apparatus, a command for performing said re-balancing;

calculating, by said monitoring apparatus in response to said command, a sum value for all of said current loads associated with said plurality of electrical devices;

comparing, by said monitoring apparatus in response to said calculating, said sum value to a maximum threshold value associated with each power supplier entity of said plurality of power supplier entities;

determining, by said monitoring apparatus based on said comparing, if said sum value exceeds said maximum threshold value; and enabling, by said monitoring apparatus based on results of said determining, a load balance modification process.

7. The method of claim 1, wherein said generating said first report comprises:

resetting, by said monitoring apparatus, all load request values for said plurality of powersupplier entities;

calculating, by said monitoring apparatus, said current loads; and calculating, by said monitoring apparatus, a power value for power required to satisfy said current loads; and transmitting, by said monitoring apparatus to said plurality of power supplier entities, said power value.

8. The method of claim 1, wherein said generating said group of reports comprises:

generating, by said monitoring apparatus, an identifier associated with each power supplier entity of said plurality of power supplier entities;

generating, by said monitoring apparatus, total kilowatt hours data associated with each said associated power supplier entity; and generating, by said monitoring apparatus, power type data associated with each said associated power supplier entity, wherein said group of reports comprises each said identifier, said total kilowatt hours data, and power type data.

9. The method of claim 1, wherein said generating said second report comprises:

computing, by said monitoring apparatus, a current total load associated with said plurality of electrical devices;

computing, by said monitoring apparatus, a time integral for power consumption; and updating, by said monitoring apparatus, said power consumption.

10. The method of claim 1, wherein all steps of claim 1 are performed simultaneously.

11. The method of claim 1, further comprising:

monitoring, by said monitoring apparatus, a plurality of different power types being received from each power supplier entity of said plurality of power supplier entities.

12. The method of claim 1, further comprising:

monitoring, by said monitoring apparatus, a plurality of different rate structures being received from each power supplier entity of said plurality of power supplier entities.

13. The method of claim 1, further comprising:

receiving, by said monitoring apparatus from said plurality of power supplier entities, pricing data specifying prices associated with different power types being received from each power supplier entity of said plurality of power supplier entities;

receiving, by said monitoring apparatus from said plurality of power supplier entities, limit data specifying consumption limits associated with said different power types;

transmitting, by said monitoring apparatus to said plurality of power supplier entities in response to said limit data, bidding data specifying monetary bids exceeding said prices; and receiving, by said monitoring apparatus from said plurality of power supplier entities in response to said bidding data, response data specifying an acceptance or denial of said monetary bids.

14. The method of claim 1, further comprising:

receiving, by said monitoring apparatus from a power source associated with a user of said plurality of electrical devices, a first power data value associated with a first specified amount of power being generated by said power source;

receiving, by said monitoring apparatus from said plurality of electrical devices, a second power data value associated with a second specified amount of power being consumed by said plurality of electrical devices, wherein said second power data value comprises a fractional portion of said first power data value;

calculating, by said monitoring apparatus in response to said receiving said first power data value and said receiving said second power data value, a surplus power data value specifying a surplus amount of power being generated by said power source, wherein said calculating said surplus power data value comprises subtracting said second power data value from said first power data value;

transmitting, by said monitoring apparatus to said plurality of power supplier entities, said surplus power data value; and receiving, by said monitoring apparatus from said plurality of power supplier entities in response to said surplus power data value, a request for receiving said surplus amount of power.

15. The method of claim 14, further comprising:

enabling, by said monitoring apparatus in response to said request, a transmission of said surplus amount of power to at least one power supplier entity of said plurality of power supplier entities.

16. The method of claim 1, further comprising:

encrypting, by said monitoring apparatus, said first report, said second report, and said group of reports.

17. The method of claim 1, further comprising:

receiving, by said monitoring apparatus from said plurality of power supplier entities, advanced notification data indicating changes in power availability and/or changes in price for power being generated by said plurality of power supplier entities.

18. A computer program product, comprising a computer storage medium comprising a computer readable program code embodied therein, said computer readable program code configured to perform the method of claim 1 upon being executed by a processor of a computing system.

19. A computing system comprising a processor coupled to a computer-readable memory unit, said memory unit comprising a computer readable code configured to be executed by the processor to perform the method of claim 1.

20. A process for supporting computer infrastructure, said process comprising providing at least one support service for at least one of creating, integrating, hosting, maintaining, and deploying computer-readable code in a computing system, wherein the code in combination with the computing system is capable of performing the method of claim 1.

* * * * *